(12) United States Patent
Watson et al.

(10) Patent No.: US 12,524,530 B2
(45) Date of Patent: Jan. 13, 2026

(54) ATTACK DETECTION AND COUNTERMEASURE IDENTIFICATION SYSTEM

(71) Applicant: Lawrence Livermore National Security, LLC, Livermore, CA (US)

(72) Inventors: Jean-Paul Watson, Livermore, CA (US); Alyson Lindsey Fox, San Leandro, CA (US); Sarah Camille Mousley Mackay, Livermore, CA (US); Wayne Bradford Mitchell, Hayward, CA (US); Matthew Landen, Atlanta, GA (US); Key-Whan Chung, Urbana, IL (US); Elizabeth Diane Reed, Urbana, IL (US)

(73) Assignee: Lawrence Livermore National Security, Livermore, CA (US)

( * ) Notice: Subject to any disclaimer, the term of this patent is extended or adjusted under 35 U.S.C. 154(b) by 6 days.

(21) Appl. No.: 18/089,373

(22) Filed: Dec. 27, 2022

(65) Prior Publication Data

US 2023/0297672 A1     Sep. 21, 2023

Related U.S. Application Data

(60) Provisional application No. 63/294,064, filed on Dec. 27, 2021.

(51) Int. Cl.
    *G06F 21/55*     (2013.01)
    *G06N 3/092*     (2023.01)

(52) U.S. Cl.
    CPC ........... *G06F 21/554* (2013.01); *G06N 3/092* (2023.01); *G06F 2221/034* (2013.01)

(58) Field of Classification Search
    CPC ........... G06F 21/554; G06F 2221/034; G06N 3/092; G06N 7/01; G06N 20/00
    See application file for complete search history.

(56) References Cited

U.S. PATENT DOCUMENTS 9,043,894 B1 *   5/2015   Dennison ............ H04L 63/1408
                                                            726/11
9,779,271 B2 *   10/2017   Kanakarajan ...... G08B 13/1418
(Continued)

OTHER PUBLICATIONS

P. Xu et al., "Active Power Correction Strategies Based on Deep Reinforcement Learning—Part I: A Simulation-driven Solution for Robustness,"in CSEE Journal of Power and Energy Systems, vol. 8, No. 4, pp. 1122-1133, Jul. 2022.*
(Continued)

*Primary Examiner* — David Garcia Cervetti
(74) *Attorney, Agent, or Firm* — Perkins Coie LLP; Colin M. Fowler

(57) ABSTRACT

A method is disclosed which comprises accessing a detector model that is trained in parallel with an operator model and an attacker model using a reinforcement learning technique based on iteratively simulating scenarios of operation of an environment to generate training data and learning weights of the models based on the simulated training data. The simulating of a scenario is based on the last learned weights of the models. The method further comprises, during operation of the environment, applying the detector model to an operator action, a prior observation of state of the environment from prior to taking the operator action, and a current observation of the environment from after taking the operator action, to detect whether an attack on the environment has occurred.

16 Claims, 10 Drawing Sheets

(56) References Cited

U.S. PATENT DOCUMENTS

| | | | | |
|---|---|---|---|---|
| 10,452,845 | B2* | 10/2019 | Mestha | G05B 23/0275 |
| 10,581,235 | B2* | 3/2020 | Seuss | H02H 1/0092 |
| 10,601,862 | B1* | 3/2020 | Kurupati | G06N 20/00 |
| 11,050,234 | B2* | 6/2021 | Schweitzer, III | H02J 3/18 |
| 11,165,812 | B2* | 11/2021 | Satish | G06F 16/285 |
| 11,665,194 | B2* | 5/2023 | Reddy | H04L 63/1458 726/22 |
| 11,689,021 | B2* | 6/2023 | Wu | H02J 13/00001 703/18 |
| 11,956,255 | B1* | 4/2024 | Holub | G06N 20/00 |
| 11,972,335 | B2* | 4/2024 | Dasgupta | G06F 18/285 |
| 12,113,810 | B2* | 10/2024 | Hariri | H04L 63/1425 |
| 12,184,697 | B2* | 12/2024 | Crabtree | G06F 16/2477 |
| 12,200,014 | B2* | 1/2025 | El Gamal | H04L 63/1491 |
| 2007/0198235 | A1* | 8/2007 | Takeuchi | G06F 30/367 703/2 |
| 2013/0132149 | A1* | 5/2013 | Wei | G05B 23/02 340/3.1 |
| 2015/0163242 | A1* | 6/2015 | Laidlaw | H04L 63/1425 726/22 |
| 2016/0028753 | A1* | 1/2016 | Di Pietro | G06F 21/577 726/23 |
| 2017/0093889 | A1* | 3/2017 | McEachern | H04L 63/1416 |
| 2017/0104780 | A1* | 4/2017 | Zaffarano | H04L 63/20 |
| 2017/0279839 | A1* | 9/2017 | Vasseur | H04L 63/1425 |
| 2018/0024900 | A1* | 1/2018 | Premerlani | G05B 23/0227 714/41 |
| 2018/0260561 | A1* | 9/2018 | Mestha | G05B 23/0275 |
| 2018/0262525 | A1* | 9/2018 | Yan | G06N 20/00 |
| 2019/0260196 | A1* | 8/2019 | Seuss | H02H 3/08 |
| 2019/0260768 | A1* | 8/2019 | Mestha | H04L 63/1416 |
| 2020/0119556 | A1* | 4/2020 | Shi | G06N 3/08 |
| 2020/0228566 | A1* | 7/2020 | Kurupati | H04L 63/1441 |
| 2020/0287930 | A1* | 9/2020 | Satish | G06F 16/285 |
| 2020/0327411 | A1* | 10/2020 | Shi | G06N 3/088 |
| 2021/0051162 | A1* | 2/2021 | Taylor | G06N 20/00 |
| 2021/0158162 | A1* | 5/2021 | Hafner | G06N 3/006 |
| 2021/0182385 | A1* | 6/2021 | Roychowdhury | G06N 7/01 |
| 2021/0201156 | A1* | 7/2021 | Hafner | G06N 3/006 |
| 2021/0264795 | A1* | 8/2021 | Mguni | G06N 3/006 |
| 2021/0295176 | A1* | 9/2021 | Jacobs | G06N 5/01 |
| 2021/0334441 | A1* | 10/2021 | Wu | H02H 3/006 |
| 2021/0356923 | A1* | 11/2021 | Wu | G05B 19/042 |
| 2022/0019674 | A1* | 1/2022 | Frey | H04L 63/14 |
| 2022/0036186 | A1* | 2/2022 | Refaat | G06N 3/088 |
| 2022/0131366 | A1* | 4/2022 | Schweitzer, III | H02J 13/00004 |
| 2022/0173591 | A1* | 6/2022 | Cova Acosta | G06F 30/20 |
| 2022/0201042 | A1* | 6/2022 | Crabtree | G06F 16/2477 |
| 2022/0210200 | A1* | 6/2022 | Crabtree | G06F 16/951 |
| 2022/0224723 | A1* | 7/2022 | Crabtree | H04L 63/1441 |
| 2022/0245441 | A1* | 8/2022 | Dechene | H04L 45/08 |
| 2022/0284156 | A1* | 9/2022 | Zheng | G06F 30/27 |
| 2022/0303290 | A1* | 9/2022 | Baidya | H04L 63/1441 |
| 2022/0343117 | A1* | 10/2022 | Jeong | H04W 16/22 |
| 2022/0343230 | A1* | 10/2022 | Casey | G06F 30/18 |
| 2022/0345479 | A1* | 10/2022 | Markonis | H04L 63/1433 |
| 2022/0357729 | A1* | 11/2022 | Xu | G06N 3/094 |
| 2022/0360597 | A1* | 11/2022 | Fellows | H04L 51/212 |
| 2023/0073326 | A1* | 3/2023 | Schrittwieser | G06F 18/214 |
| 2023/0115046 | A1* | 4/2023 | Karta | H04L 63/1483 726/23 |
| 2023/0177165 | A1* | 6/2023 | Underwood | G06F 21/577 726/25 |
| 2023/0185912 | A1* | 6/2023 | Sinn | G06F 21/56 726/23 |
| 2023/0325511 | A1* | 10/2023 | Jaster | G06Q 20/065 726/23 |
| 2023/0378753 | A1* | 11/2023 | Marinakis | H02J 3/0012 |
| 2024/0061939 | A1* | 2/2024 | Pieczul | G06F 21/577 |
| 2024/0119298 | A1* | 4/2024 | Pham | G06N 3/092 |
| 2024/0176894 | A1* | 5/2024 | Lev | G06F 30/20 |
| 2024/0311639 | A1* | 9/2024 | Hansen | G06N 3/047 |
| 2025/0023902 | A1* | 1/2025 | Thepie Fapi | G05B 23/0256 |

OTHER PUBLICATIONS

Chen et al., Understanding the Safety Requirements for Learning-based Power Systems Operations, arXiv,Oct. 2021.*
D. An, Q. Yang, W. Liu, and Y. Zhang, "Defending Against Data Integrity Attacks in Smart Grid: A Deep Reinforcement Learning-Based Approach," in IEEE Access, vol. 7, pp. 110835-110845, 2019.*
S. Paul, Z.Ni and C.Mu, "A Learning-Based Solution for an Adversarial Repeated Game in Cyber—Physical Power Systems," in IEEE Transactions on Neural Networks and Learning Systems, vol. 31, No. 11, pp. 4512-4523, Nov. 2020.*
L. Omnes, A. Marot, and B.Donnot, "Adversarial Training for a Continuous Robustness Control Problem in Power Systems," 2021 IEEE Madrid Power Tech, Madrid, Spain, 2021.*
An, Dou, et al., "Defending against data integrity attacks in smart grid: A deep reinforcement learning-based approach,". IEEE Access, 7:110835-110845, 2019.
Blackenergy apt attacks in ukraine. https://www.kaspersky.com/resource-center/threats/blackenergy.
Chen Binbin. AsprinChina/L2RPN_nips_2020_a_ppo_solution, May 2021. original-date: 2020-11-12T03:53:04Z. Accessed via: https://github.com/AsprinChina/L2RPN_NIPS_2020_a_PPO_Solution.
Chung, Keywhan, et al., "Game theory with learning for cyber security monitoring," In 2016 IEEE 17th International Symposium on High Assurance Systems Engineering (HASE), pp. 1-8. IEEE, 2016.
Clemente, Alfredo V., et al., "Efficient parallel methods for deep reinforcement learning," arXiv preprint arXiv:1705.04862, 2017.
Dán, György, et al., "Stealth attacks and protection schemes for state estimators in power systems," In 2010 first IEEE international conference on smart grid communications, pp. 214-219. IEEE, 2010.
Daumé, Hal, "A course in machine learning," 2015.
Deokar, Bhagyashree, et al., "Intrusion detection system using log files and reinforcement learning," International Journal of Computer Applications, 45(19):28-35, 2012.
Dragonfly: Western energy sector targeted by sophisticated attack group, accessed via: https://symantec-enterprise-blogs.security.com/blogs/threat-intelligence/dragonfly-energy-sector-cyber-attacks.
Dragos, Inc., "2020 ICS cybersecurity year in review," Apr. 2021. Accessed Via: https://www.dragos.com/blog/industry-news/2020-ics-cybersecurity-year-in-review/.
Dragos, Inc., "The evolution of cyber attacks on electric operations," 2019. Accessed via: https://www.dragos.com/blog/industry-news/the-evolution-of-cyber-attacks-on-electric-operations/.
Eremia, Mircea, et al., "Handbook of electrical power system dynamics: modeling, stability, and control," vol. 92. John Wiley & Sons, 2013.
Falcon complete: Managed detection and response, accessed via: https://www.crowdstrike.com/endpoint-security-products/falcon-complete/.
Ferdowsi, Aidin, et al., "Robust deep reinforcement learning for security and safety in autonomous vehicle systems," In 2018 21st International Conference on Intelligent Transportation Systems (ITSC), pp. 307-312. IEEE, 2018.
Garcia, Luis A., et al., "Hey, my malware knows physics! Attacking plcs with physical model aware rootkit," In NDSS, 2017.
Github, Grid2op: a testbed platform to model sequential decision making in power systems. Accessed via: https://github.com/rte-france/Grid2Op.
Github, Lujasone. Lujasone/neurips_2020_l2rpn_comp_an_approach: The implementation of neurips_2020_l2rpn_track1 (robustness) and track2 (adaptability) competition. Accessed via: https://github.com/lujasone/NeurIPS_2020_L2RPN_Comp_An_Approach.
Glenn, Colleen, et al., "Cyber threat and vulnerability analysis of the U.S. electric sector," Technical report, Idaho National Lab. (INL), Idaho Falls, ID (United States), 2016.
Glover, J Duncan, et al., "Power system analysis & design," SI version. Cen gage Learning, 2012.

(56) References Cited

OTHER PUBLICATIONS

Gupta, Abhishek, et al., "Adversarial reinforcement learning for observer design in autonomous systems under cyber attacks," arXiv preprint arXiv:1809.06784, 2018.

György, András, et al., "Efficient multi-start strategies for local search algorithms," Journal of Artificial Intelligence Research, 41:407-444, 2011.

Han, Yi, et al., "Reinforcement learning for autonomous defence in software-defined networking," In International Conference on Decision and Game Theory for Security, pp. 145-165. Springer, 2018.

Hausknecht, Matthew, et al., "Deep recurrent q-learning for partially observable mdps," In 2015 aaai fall symposium series, 2015.

Illinois Information Trust Institute, Illinois Center for a Smarter Electric Grid (ICSEG), IEEE 14-bus system. Accessed via: https://icseg.iti.illinois.edu/ieee-14-bus-system.

Kaelbling, Leslie Pack, et al., "Planning and acting in partially observable stochastic domains," Artificial Intelligence, 101(1):99-134, 1998.

Kurt, Mehmet Necip, et al., "Online cyber-attack detection in smart grid: A reinforcement learning approach," IEEE Trans actions on Smart Grid, 10(5):5174-5185, 2019.

Learning to Run a Power Network—Neurips Track 1, L2rpn neurips 2020—robustness track. Accessed via: https://competitions.codalab.org/competitions/25426.

Lee, Robert M, et al., "Crashoverride: Analysis of the threat to electric grid operations," Dragos Inc., Mar. 2017.

Li, Yanda, et al., "Mobile cloud offloading for malware detections with learning," In 2015 IEEE Conference on Computer Communications Workshops (INFOCOM WKSHPS), pp. 197-201. IEEE, 2015.

Li, Yuancheng, et al., "False data injection attacks with incomplete network topology information in smart grid," IEEE Access, 7:3656-3664, 2018.

Liu, Yao, et al., "False data injection attacks against state estimation in electric power grids," ACM Transactions on Information and System Security (TISSEC), 14(1):1-33, 2011.

López-Morales, Efrén, et al., "Honeyplc: A next-generation honeypot for industrial control systems," In Proceedings of the 2020 ACM SIGSAC Conference on Computer and Communications Security, pp. 279-291, 2020.

Malialis, Kleanthis, et al., "Distributed response to network intrusions using multiagent reinforcement learning," Engineering Applications of Artificial Intelligence, 41:270-284, 2015.

Mandlekar, Ajay, et al., "Adversarially robust policy learning: Active construction of physically-plausible perturbations," In 2017 IEEE/RSJ International Conference on Intelligent Robots and Systems (IROS), pp. 3932-3939. IEEE, 2017.

Marot, Antoine, et al., "Learning to run a power network challenge for training topology controllers," Electric Power Systems Research, 189:106635, 2020.

Marot, Antoine, et al., "Learning to run a power network challenge: a retrospective analysis," arXiv preprint arXiv:2103.03104, 2021.

Minih, Volodymyr, et al., "Asynchronous methods for deep reinforcement learning", In International conference on machine learning, pp. 1928-1937. PMLR, 2016.

Nair, Arun, et al. "Massively parallel methods for deep reinforcement learning," arXiv preprint arXiv:1507.04296, 2015.

Next-generation firewalls. Accessed via: https://www.paloaltonetworks.com/network-security/next-generation-firewall.

Nguyen, Thanh Thi, et al., "Deep reinforcement learning for cyber security," arXiv preprint arXiv:1906.05799, 2021.

Omnes, Loïc, et al., "Adversarial training for continuous robustness control problem in power systems," arXiv preprint arXiv:2012.11390, 2020.

Paszke, Adam, et el., "Pytorch: An imperative style, high-performance deep learning library," Advances in Neural Information Processing Systems 32, pp. 8024-8035. Curran Associates, Inc., 2019.

Pateria, Shubham, et al., "Hierarchical reinforcement learning: A comprehensive survey," ACM Computing Surveys (CSUR), 54(5):1-35, 2021.

Powers, David MW, "Evaluation: from precision, recall and f-measure to roc, informedness, markedness and correlation," arXiv preprint arXiv:2010.16061, 2020.

Shao, Wei, et al., "Corrective switching algorithm for relieving overloads and voltage violations," IEEE Transactions on Power Systems, 20(4):1877-1885, 2005.

Shekari, Tohid, et al., "Rfdids: Radio frequency-based distributed intrusion detection system for the power grid," In NDSS, 2019.

Slowik, Joe, "Crashoverride: Reassessing the 2016 ukraine electric power event as a protection-focused attack," Dragos, Inc, 2019.

Slowik, Joe, "Stuxnet to crashoverride to trisis: Evaluating the history & future of integrity-based attacks on industrial environments," 2020.

Soltan, Saleh, et al., "Blackiot: Iot botnet of high wattage devices can disrupt the power grid," In 27th fUSENIXg Security Symposium (fUSENIXg Security 18), pp. 15-32, 2018.

Stooke, Adam, et al., "Accelerated methods for deep reinforcement learning," arXiv preprint arXiv:1803.02811, 2019.

Sutton, Richard S, et al., "Reinforcement learning: An introduction," MIT press, 2018.

Tian, Jiwei, et al., "Data-driven and low-sparsity false data injection attacks in smart grid," Security and Communication Networks, 2018.

Trellix Email Security, accessed via: https://www.trellix.com/en-us/products/email-security.html.

Trellix Endpoint security software and solutions. Accessed via: https://www.fireeye.com/products/endpoint-security.html.

Van Hasselt, Hado, et al., "Deep reinforcement learning with double q-learning.," In Proceedings of the AAAI Conference on Artificial Intelligence, vol. 30, 2016.

Wan, Xiaoyue, et al., "Reinforcement learning based mobile offloading for cloud-based malware detection," In GLOBECOM 2017-2017 IEEE Global Communications Conference, pp. 1-6. IEEE, 2017.

Wang, Zhenhua, et al., "Coordinated topology attacks in smart grid using deep reinforcement learning," IEEE Transactions on Industrial Informatics, 17(2):1407-1415, 2021.

Wikipedia, "Reinforcement learning," Retrieved from: Retrieved from "https://en.wikipedia.org/w/index.php?title=Reinforcement_learning&oldid=1046562875".

Wilson, David, et al., "Deep learning-aided cyber-attack detection in power transmission systems," In 2018 IEEE Power & Energy Society General Meeting (PESGM), pp. 1-5. IEEE, 2018.

Wood, Allen J., et al., "Power generation, operation, and control," John Wiley & Sons, 2013.

Wu, Xian, et al., "Adversarial policy training against deep reinforcement learning," In 30th fUSENIXg Security Symposium (fUSENIXg Security 21), 2021.

Xiao, Liang, et al., "Spoofing detection with reinforcement learning in wireless networks," In 2015 IEEE Global Communications Conference (GLOBECOM), pp. 1-5. IEEE, 2015.

Xu, Xin, "Sequential anomaly detection based on temporal-difference learning: Principles, models and case studies," Applied Soft Computing, 10(3):859-867, 2010.

Xu, Xin, et al., "A kernel-based reinforcement learning approach to dynamic behavior modeling of intrusion detection," In International Symposium on Neural Networks, pp. 455-464. Springer, 2007.

Xu, Xin, et al., "A reinforcement learning approach for host-based intrusion detection using sequences of system calls," In International Conference on Intelligent Computing, pp. 995-1003. Springer, 2005.

Yau, David KY, et al., "Defending against distributed denial-of-service attacks with max-min fair server-centric router throttles," IEEE/ACM Transactions on Networking, 13(1):29-42, 2005.

Zhang, Chiyuan, et al., "A study on overfitting in deep reinforcement learning," arXiv preprint arXiv:1804.06893, 2018.

Zhou, Bo, et al., "Action set based policy optimization for safe power grid management," 2021.

(56) References Cited

OTHER PUBLICATIONS

Zhu, Minghui, et al., "Reinforcement learning algorithms for adaptive cyber defense against heartbleed," In Proceedings of the First ACM Workshop on Moving Target Defense, pp. 51-58, 2014.

* cited by examiner

ATTACK DETECTION AND COUNTERMEASURE IDENTIFICATION SYSTEM

CROSS-REFERENCE TO RELATED APPLICATION(S)

This application claims the benefit of U.S. provisional patent application No. 63/294,064, filed on Dec. 27, 2021, which is incorporated herein by reference.

STATEMENT REGARDING FEDERALLY SPONSORED RESEARCH

This invention was made with Government support under DE-AC52-07NA27344 awarded by the United States Department of Energy. The Government has certain rights in the invention.

BACKGROUND

Electricity is required for almost every aspect of modern society. Given its importance, power generation and transmission systems must remain functional and enable reliable power delivery to customers. However, there are a number of factors that degrade the reliability of these systems, such as aging hardware and the recent rise of cyberattacks targeting power grids.

The increase in digital connectivity of power grid control systems increases the attack surface of the power grid as seen in recent cyberattacks including Dragonfly, BLACK-ENERGY, and CRASHOVERRIDE. Generally, attackers gain access to the information technology (IT) networks of power systems by leveraging well-studied, enterprise attack vectors such as phishing and credential harvesting. Once an attacker gains access, the attacker frequently moves laterally until they locate human machine interface (HMI) systems that connect IT systems to the operational technology (OT) systems, which control the physical components of power operations. From this position, the attacker can execute malicious commands or deploy malware to disrupt the power grid, potentially causing blackouts and harm to operator agents.

Various defense mechanisms have been deployed to prevent unauthorized access to enterprise networks (e.g., a banking system or e-commerce system). The defense mechanisms include endpoint protection systems, fire-walls, and email defenses to detect and prevent attacks. Although these solutions can effectively defend enterprise systems against many threats, attackers still find attack vectors that allow unauthorized access. In a power grid environment, such IT defenses, however, do not address the impacts of cyberattacks on the physical components (e.g., power lines and generators), the industrial control systems (ICSs), and the OT systems of a power grid.

DETAILED DESCRIPTION

Methods and systems are provided for detecting an attack on an environment and identifying operator agent actions as countermeasures to an attack on an environment. In some embodiments, an attack detection and countermeasure identification (ADCI) system is provided to detect attacks and identify countermeasures. The ADCI system identifies attacks such a false data injection attacks (FDIA) and powerline deenergizing attacks. The ADCI system provides an operation module, a detection module, and an attack module. The operation module maintains reliable power when faced with cyberattacks by executing power grid operation commands that modify the topology of the power grid (e.g., deenergize a power line or bring a generator online). The operation commands may be automatically performed as a countermeasure measures or provided to an operator (e.g., a person) to help inform manual selection of a countermeasure. The operation module helps ensure that during an attack the power grid continues to serve its customers reliably by, in some embodiments, operating autonomously when an attack is detected. The detection module notifies the operation module or operator of a power grid when an attack on the power grid is detected. The attack module is employed to simulate attacks on the power grid to generate training data to train the operation module and the detection module.

Although the ADCI system is described herein as being deployed primarily in the context of an environment that is a power grid, the ADCI system may be deployed in other environments. The other environments may include natural gas distribution grids, manufacturing systems, warehouse operation systems, oil refinery systems, power plants, and so on. As an example, in a nuclear power plant, reactor vessels, fuel rods, turbines, and so on are tightly controlled by a sophisticated ICS to ensure safe and efficient operation. A cyberattack on a component of the ICS can have disastrous consequences if effective countermeasures are not taken. The ADCI system may be employed detect cyberattack and recommend or automatically deploy countermeasures. Although describe primarily in the context of defending against cyberattacks, the ADCI system may be employed to defend against physical attacks (e.g., bombing of a substation), natural disasters (e.g., forest fire destroying a substation), or equipment failure (e.g., overheating a component of a substation).

Figure 1:
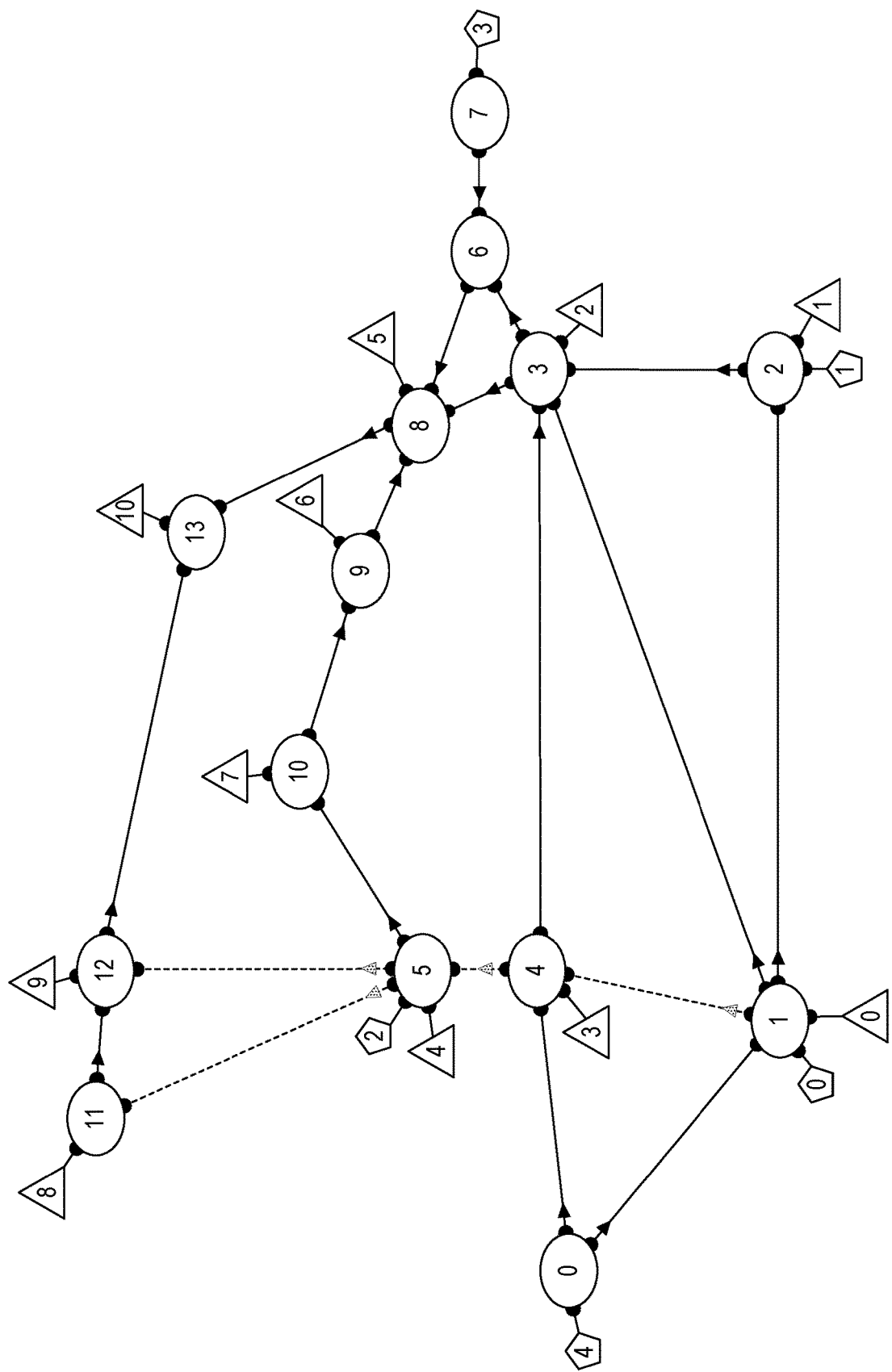
FIG. 1 illustrates a power generation system and a transmission system of an example power grid.

An electric power grid includes three systems: generation, transmission, and distribution. The generators put power into transmission networks, which transport electricity from generating sites to other locations (i.e., substations) where the power is needed. The transmission systems may span large geographical regions and connect generators to distribution grids, which contain individual customers (loads). FIG. 1 illustrates a power generation system and a transmission system of an example power grid. The power generation system includes generators represented by pentagons. The transmission network includes substations represented by ovals and powerlines represented by the lines connecting generators to substations, connecting substations, and connecting substations to loads (of the distribution system) represented by triangles.

A key metric for assessing stability of a power grid is how close each powerline is to its thermal limit that is the maximum amount of power that can flow through a powerline before it becomes overloaded. If a powerline is overloaded for a prolonged amount of time, the powerline will generally be deenergized by automated protective relays to avoid physical damage to the powerline. The power that was flowing through the powerline is diverted to neighboring powerlines, which could result in cascading impacts with more overflows and potential blackouts. Therefore, maintaining power levels below thermal limits is a priority for operation of a power grid.

In some embodiments, the ADCI system employs a form of reinforcement learning (RL) to train the operation module, the attacker module, the detection module. (In the following, these modules are referred to as agents.) RL is the process of learning what actions to take in different situations to maximize a reward over time. The ADCI system may be modeled using a sequential decision-making problem. A sequential decision-making problem may be formalized as a Markov decision process (MDP), which is defined as a tuple $\langle S, \mathcal{A}, T, \mathcal{R} \rangle$ where S is the set of states, A is the set of actions, $T: S \times A \times S \rightarrow [0, 1]$ is the transition function that assigns a probability distribution over potential next states, given the current state and selected action, and $R: S \times A \times S \rightarrow R$ is the reward function that returns a real-valued reward for each transition. The goal of a sequential decision-making process is to learn a policy, $\pi: S \rightarrow A$, for an agent such that the expected total discounted reward or return denoted R, obtained over time is maximized. Using a discount factor $\gamma \in (0, 1]$, the return is defined as $$R = \sum_{t=0}^{N} \gamma^t r_t,$$

where $r_t$ is the reward obtained at timestep t when policy $\pi$ is followed. (Note: Each timestep consists of taking an action in the current state and receiving a reward and next state.) The return is used to trade off immediate and long-term reward.

A sequential decision-making problem may be solve using a Q-Learning algorithm which is an RL algorithm. After each action, the Q-Learning algorithm updates the estimated value of a state/action pair using the following formula:

$$Q^{t+1}(s_t, a_t) = Q^t(s_t, a_t) + \alpha \left[ r_t + \gamma \max_{a \in A} Q^t(s_{t+1}, a) - Q^t(s_t, a_t) \right],$$

where $Q^t(\cdot, \cdot)$ is an action value function that inputs a state $s_t$ and an action $a_t$, and outputs an action value estimate at timestep t and where $\alpha$ is the learning rate. The agent's policy is defined as $\pi(s_t) = \text{argmax}_{a \in A} Q(s_t, a)$.

When Q-Learning is used for cybersecurity of a power grid, two extensions may be needed: partial observability and function approximation. With partial observability, an agent does not see certain aspects of the current state, which reflects the reality that accurate measurement of each component of the power grid is infeasible. To represent the hidden state (e.g., a measurement that is not accurately measured), the ADCI system may employ a partial-observable Markov decision process (POMDP). A POMDP is defined as a tuple (S, A, T, R, $\Omega$, O) where the first four terms define an MDP. Instead of receiving the current state of the environment, an agent receives an observation of the current state drawn from the set of observations $\Omega$ according to the function $O: S \times A \rightarrow \Pi(\Omega)$, which returns a probability distribution over possible observations given a state. The ADCI system attempts to learn a policy for each agent that maximizes their return. However, such a policy maps observations to actions instead of states giving $\pi: O \rightarrow A$. With function approximation, the ADCI system employs function approximators instead of traditional, tabular data structures. The ADCI employs deep reinforcement learning (DRL) using neural networks (or other machine learning techniques) to approximate the values of functions.

The ADCI system addresses various challenges arise when designing countermeasures (defenses) to sophisticated cyberattacks that target the power grid. The first challenge is referred to as the State-Action Space Explosion. Because there is a very large number of potential power grid configurations and response actions (countermeasures), operator agents 203 cannot analyze enough of them to select the best response to a particular observation of the state. To add to the difficulty of selecting a response action, attacker agents have a number of options regarding which specific attacks to execute making the operator agent's analysis even more difficult. The second challenge is the referred to as an Unknown Attack Playbook. Although an autonomous operator agent could be trained on a pre-designed set of attacks, it is difficult to manually construct sophisticated attacks. If the attacks are too simplistic during training, the autonomous operator agent may not be able to respond effectively when deployed.

The ADCI system addresses these challenges by applying DRL techniques to the power grid attack and defense problem. By adopting DRL techniques, the ADCI system allows for effective response actions to be learned from diverse scenarios. In addition, to maximize the sophistication of the attacks used when training the operator agent 203, the ADCI system concurrently trains an intelligent adversary, an attacker agent, to learn attacks that maximize the damage to the power grid. By putting the operator agent 203 into challenging situations during training, the operator agent 203 learns effective response strategies and improves its policy over the course of training As mentioned above, the ADCI system addresses the challenges posed by cyberattacks on power grids by automating power grid operation, generating challenging cyberattacks, and detecting and responding to these attacks. The ADCI system employs a sequential decision-making problem model so that DRL techniques learn, through experience, what actions to take to achieve the goals. The ADCI system employs an operator agent, an attacker agent, and a detector agent to detect attacks and identify countermeasures. The operator agent observes the current state of the power grid and takes actions that modify the generation setpoints and the topology of the power grid to ensure that all loads receive sufficient power and the power grid remains stable. The operator agent operates in the presence of malicious entities that intentionally try to destabilize the grid. The attacker agent learns which powerlines to disconnect to maximize the impact of its attacks. The detector agent detects these attacks based on a prior and current observations of the power grid and the operator agent's actions that result in changes in the observations The detector agent learns a policy that detects attacks as early as possible while minimizing the number of false positives to avoid alert fatigue.

Figure 2A:
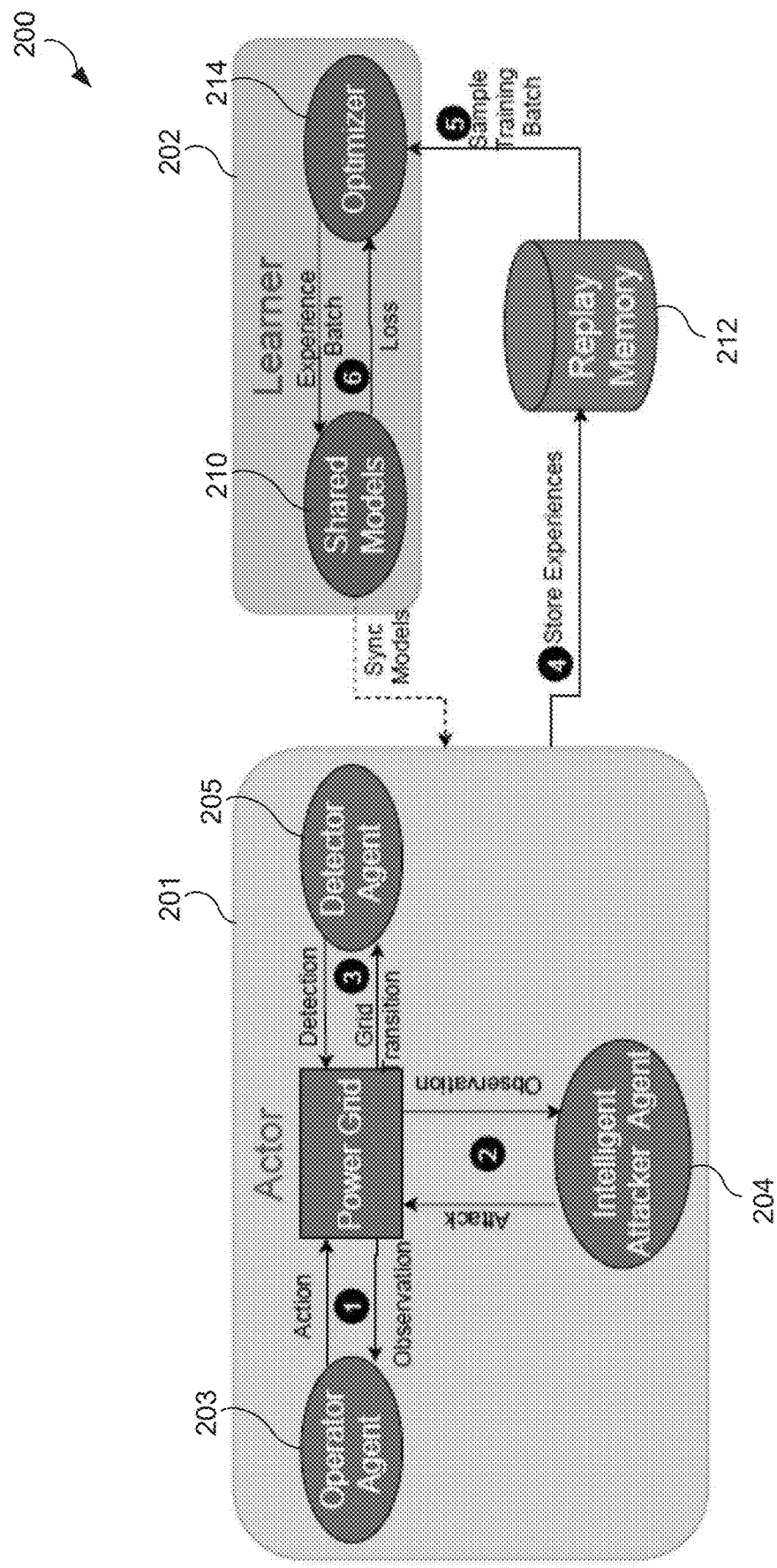
FIG. 2A is a block diagram that illustrates the learning process of agents.
Figure 2B:
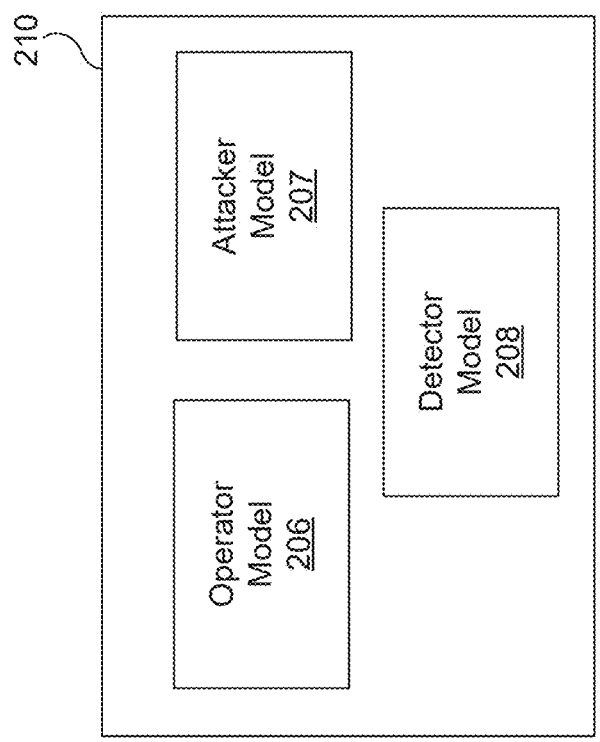
FIG. 2B is a block diagram that illustrates the set of shared models.

FIG. 2A is a block diagram that illustrates the learning process of these three agents. The ADCI system 200 employs an actor 201 and a learner 202. The actor 201 runs simulations involving an operator agent 203, an attacker agent 204, and a detector agent 205 205 that use, respectively, an operator model 206, an attacker model 207, and a detector model 208 (see FIG. 2B), as defined by their weights (e.g., NN weights) to generate training data for learning the models (also referred to as the policies). The operator model 206, attacker model 207, and detector model 208 are part of a set of shared models 210, as shown in FIG. 2B. The learner 202 learns new weights based on the training data. The process of generating training data and learning new weights is repeated until a termination criterion is satisfied.

To train the models 206, 207 and 208, the actor 201 runs multiple simulations that each generates training data. During each timestep of a simulation, all three agents 203, 204 and 205 have the opportunity to act. During each timestep, the operator agent 203 chooses (1) an operator action that is a modification of the power grid topology or generation to maintain the power grid reliability. The attacker agent 204 chooses (2) an attacker action based on observations of the power grid and the operator action, which may be which powerline to attack. The detector agent 205 chooses (3) a detector action that indicates whether it believes an attack occurred, given the previous and current power grid observations and the operator agent's action. After each agent acts, the ADCI system 200 allocates a numerical reward that signifies the quality of the agent's action, and the grid transitions to the next observation. Periodically, the observations, actions, and rewards seen by the agents 203, 204 and 205 are sent (4) to one or more replay memories 212 that archive the training data as a representation of a simulated experience. The optimizer 214 samples (5) batches of training from the replay memories 212 and evaluates a loss function. The optimizer 214 updates (6) the agents' models 206, which may be parameterized by neural networks, based on the loss. The actor 201 then runs the next simulation using the updated models.

In some embodiments, the ADCI system 200 may spawn multiple instances of a combination of an actor 201 and a leaner 202 that operate in parallel. Each actor 201 contains an independent power grid (e.g., with different topologies). After the actors 201 complete a simulation, the leaners 202 cooperate by each generating a loss at each step of the learning, and each uses the mean (or average or other metric) of the losses calculated by each learner 202 to adjust the weights of the its models. This adjusting effectively synchronizes each model of each instance with the model of each other instance, so they have the same weights that are learned from the simulations of the multiple instances. When the learning for a simulation is complete, each actor 201 performs the next simulation with the updated and synchronized models.

As discussed above, the ADCI system 200 assumes that the observation space is less than the entire state of the power grid. An observation contains the active and reactive power and the voltages for each generator, load, and powerline; the current and phase angle of each powerline; and the dispatch levels of each generator. An observation also contains information relating to the connectivity of the power grid including whether each powerline is connected and, if so, to which bus in the substation. An observation also includes the thermal capacity and the percentage of that capacity that is currently in use by each powerline. From these features of an observation, the operator agent can identify different paths through which power can flow from generators to loads and which powerlines are at risk of being disconnected due to overflow. A maintenance schedule (e.g., involving downed powerlines or generators) is also provided to the operator agent 203 to allow the operator agent to plan for anticipated periods where powerlines may be unavailable.

In cases where the attacker agent 204 injects false data (an FDIA) into the operator agent's observation, the power grid can appear the same when it is under attack and when it is not. To respond effectively, the operator agent 203 learns different actions for similar observations. In an effort to distinguish these cases, the ADCI system 200 can include information about how unexpected the current power grid state is in the observation. In operation, the ADCI system 200 allows operators the ability to simulate a command to determine what effects it will have on the power grid. The ADCI system 200 can determine how unexpected a transition from one state to another is by computing the difference between each measurement in the simulated and actual next observation. These features help the operator learn what response actions are required to stabilize the grid.

The ADCI system 200 employs an operator action space with actions that fall into three categories: line connections, substation reconfigurations, and generator re-dispatching. Each powerline in the power grid can be reconnected if it is deenergized to allow recovery from an attack by reenergizing powerlines that were targeted by the attacks. The operator agent 203 can perform bus bar switching on any of the substations in the system. Each substation may have two bus bars that carry electricity through the powerlines connected to the bus. Switching dictates which bus each powerline in a substation is connected to and can relieve powerline overflows and voltage violations. The operator agent 203 can also change the amount of energy produced by different generators on the power grid. The total number of operator actions grows exponentially with the power grid size. To make policy learning more feasible, the ADCI system 200 may apply an action reduction technique to sample a collection of observations and, for each, simulate all operator actions and selects the operator action that reduces the percent capacity of the powerlines the most and includes these operator actions in the final action set.

The ADCI system 200 can employ an operator agent transition function that returns the next observation of the power grid when an operator action is taken. The transition function can be defined by changes in the power grid, load and generation profiles, and attacks. In some embodiments, given a state and an operator action, the ADCI system 200 first modifies the components in the grid according to the operator action. Then, the ADCI system 200 applies changes in loads or generator levels and starts any planned maintenance. Next, any attacks occur. The ADCI system 200 evolves the power grid according to a set of power equations for one timestep, after which the next observation is captured. During this evolution, powerlines with a flow greater than a scalar multiple of their thermal limits are disconnected, resulting in cascading outages. A state is defined as terminal when (1) a load or generator is disconnected from rest of the grid or (2) the grid breaks into multiple, isolated sub-grids.

The ADCI system 200 can employ an operator agent reward function that increases the reward as the power grid reaches more stable states. When an operator agent 203 reaches a terminal state, the operator agent 203 receives the minimum reward. This encourages the operator agent 203 to maintain reliable power for as long as possible to avoid this penalty. When the state is not terminal, there are several factors that contribute to grid stability: load served, line capacities, and generator dispatching. The ADCI system 200 generates a reward value for each factor. The load served (LS) reward quantifies the connectivity of the power grid. It is common for transmission grids to be configured in a meshed topology where, for each load, there are multiple paths from the load to different generators. When a powerline along one of these paths is disconnected, the load continues to be served by the other generators. When more generators can supply power to a load, the risk of that load being unserved is reduced. To capture this notion, the LS served reward is equal to the number of paths from a generator to a load, averaged over all loads in the power grid. When this reward is higher, the power grid can withstand powerline disconnections better because the loads can receive power from other generators when one path is broken.

The powerline capacities (PL) reward reflects that when power flow exceeds the capacity of a powerline for too long, the powerline is either disconnected or the equipment may be damaged. To encourage the operator agent to avoid overloading lines, the PL reward returns the ratio of the current power in a powerline to its thermal limit, summed over all powerlines.

The generator dispatching (GD) reward penalizes dispatching of generators. In actual operation, when operator wants to increase or decrease the amount of power that a generator is putting into the power grid, a must pay a fee. To model this aspect of power operations, the GD reward is a cost computed based on the number of power generators dispatched.

The three types of rewards (LS, PL, and GD) of the non-terminal reward, r, are combined through a linear combination with predefined coefficients: $r=c_{LS}r_{LS}+c_{PL}r_{PL}+c_{GD}r_{GD}$. The coefficients are based on the relative magnitudes of the threshold types of rewards and weight each type according to its relative importance. Specifically, the LS coefficient is the highest because lower values lead directly to load loss and power grid failure. The PL coefficient is the second highest because, while overflowing lines can cause cascades and eventual blackouts, these effects are delayed and can be handled after the loads are served. When the loads and the powerlines are in stable configurations, the operator agent can help reduce the power grid operation cost. The GD coefficient is the least because it is not critical for a high-performing operator agent. The ADCI system 200 scales the non-terminal rewards into the range [0;1] to maintain the correct proportion between a failure penalty and the other rewards. With the maximum and minimum non-terminal rewards defined, the failure reward may be set to −100 in an effort to teach the operator agent to avoid terminal states.

For the operator agent, the ADCI system 200 can utilize a three-step policy: 1) a Reconnection policy to keep as many powerlines connected as possible, 2) a Boltzmann policy to prioritize the most promising actions, and 3) a simulation policy to choose the best operator action. First, if there are any powerlines that are disconnected and not currently under attack, the operator agent selects an operator action that reconnects one of these lines. The selection is based on the domain knowledge that having more powerlines for power to flow through leads to move stable power grids states. When there are no powerlines to reconnect, the operator agent samples actions values, $q_i$, for each bus bar switching action. Then, the Boltzmann policy computes a probability distribution $P(a_i)$=so fimax($q_i$/T), where $q_i$ is the value of operator action i and T is a temperature hyperparameter (of simulated annealing) that trades off exploration and exploitation. As the temperature approaches infinity, the probability distribution approaches the uniform distribution and explores non-maximal operator actions to learn about them. As the temperature approaches 0, the Boltzman policy approximates the max function and exploits the operator action values. By annealing the temperature over the course of learning, the Boltzman policy allows the operator agent to improve, while avoiding low-valued operator actions. By weighting operator actions according to their current state and operator action values, the operator agent avoids exploring operator actions with relatively low value. This avoiding of exploration helps to prevent further exploration of operator actions that immediately destabilize the power grid. During the Boltzman policy's final step, the operator agent simulates a list of candidate operator actions, drawn from the Boltzmann distribution. For each candidate, the power grid environment simulates the operator action to predict what the next observation would be if the operator action was taken given the current state. After simulating the candidate operator actions, the operator agent ranks them using a set of heuristics. First, if an operator action simulation results in a terminal state, it is removed from consideration because the operator agent wants to avoid failure states. Next, the operator agent determines how many powerlines are close to, at, or above their percent capacities in the next observation. These counts are combined with the function, $f(\rho_t)=-\#(\rho_t>0.95)-2\ \#(\rho_t>1)-5\ \#(\rho_t>1.5)$, where $\rho_t$ is the ratio of the current power divided by the powerline's thermal limit at time t, $\#(\bullet)$ is a function that returns how many powerlines make the provided condition true, and the coefficients are chosen to assign higher penalty to operator actions that result in more line overflows. Finally, ADCI system 200 factors the immediate, simulated reward into the ranking, which allows the operator agent to consider other factors in operator action selection such as the economic outcomes of the possible operator actions. Overall, each candidate operator action $a_i$ is ranked according to $f(\rho_i)+c_i^*r_i$, where $c_i$ is a constant that can be set to prioritize the overflow or the immediate reward, $r_i$. Once the scored are assigned, the Boltzman policy selects the operator action with the maximum score.

To learn the skills necessary to defend the power grid against cyberattacks, the operator agent 203 is exposed to attack scenarios during the training period. To create realistic attack scenarios for the operator agent 203 to handle, the ADCI 200 employs an attacker agent 204 that runs concurrently with the operator agent 203. Similar to the operator agent 203, the attacker agent 204 learns how to attack based on a POMDP action selection problem. The attacker agent 204 design is a weighted random attacker agent that targets individual powerlines and can deenergize a powerline for a predefined attack duration. At each timestep of a simulation, the weighted random attacker agent 204 samples the powerline to attack from a probability distribution that is proportional to the current percent capacities on each powerline. These percent capacities are normalized by the average percent capabilities to target more vulnerable powerlines rather than always targeting powerlines with the largest power flows and thermal limits. This strategy yields attacks that are both dangerous for the power grid and fairly uniform over the attackable powerlines, which prevent the operator agent 203 from predicting what attacks will occur in the future, which would give the operator agent 203 an unfair advantage. Although the attacker agent 204 creates attack scenarios for the operator agent 203 to learn how to respond, the attacker agent 204 relies on assumptions about the level of sophistication of intelligent adversaries. If these assumptions underestimate the abilities of real attackers, the operator agent 203 trained with the weighted random attacker agent 204 will likely not be prepared to respond effectively to attacks that are more damaging than the weighted random attacks. To address this, the attacker agent 204 learns an attack policy to solve the POMDP using DRL. By learning such an attack policy, the resulting attacks can better prepare the operator agent 203 to respond to real cyberattacks.

When an attacker compromises a power company's supervisory control and data acquisition (SCADA) system, the attacker has limited visibility into the current state of the grid with limits the observation space of the attacker. The ADCI system 200 may allow an attacker agent 204 to observe the same set of measurements of the current observation as the operator agent 203 and the operator action. Also, since the attacks are applied after the scheduled load, generation, and maintenance changes are applied, the attacker agent 204 also observes this information.

To define the attack space, the ADCI system 200 can employ the N−1 redundancy principle, which states that the power grid should be able to operate despite the loss of any one component. Every action in the attack space disconnects one of the powerlines. Giving the attacker agent 204 the ability to disconnect any powerline is unrealistic because powerlines that are more critical have more protection mechanisms than other powerlines. Therefore, in at least some embodiments the ADCI system 200 establishes the attack space as a subset of the possible powerline disconnection attacks, to maximize the difficulty of defending against the attacker agent 204.

In at least some embodiments, to identify this subset, a pool of initial starting points is sampled, and a sequence of improvement steps is performed guided by a fitness function to produces final points that satisfy a desired fitness level. First, each sample is defined as a subset of all of the powerlines that the attacker can target. Next, to enumerate all of the neighboring samples, one powerline that is included in the current sample is swapped with one that is not in the current sample. To assign a value to each sample, a fitness function is employed that measures the ability of the operator agent 203 to respond to attacks that are drawn from the current sample set. To quantify this, two operator agents 203 are evaluated on the same set of scenarios that are randomly drawn from all scenarios available. The first operator agent does not take any actions, and the second operator agent is trained with no attacker present. Each operator agent 203 is tested alongside a weighted random attacker with the given set of targeted lines. After running the two operator agents 203, the differences between the number of steps reached by each operator agent 203 is computed. This difference is used as a heuristic for the local search as it captures the intuition that an operator agent 203 trained with no attacker learns to respond to maintenance events and hazards such as overloaded powerline being automatically disconnected. If the second operator agent performs worse compared to first operator agent who does not take any actions, the attacks drawn from the current subset are deemed challenging for the operator agent and the subset is deemed a good candidate for the attacker agent 204.

In at least some embodiments, initially 50 random attack spaces are drawn. A local search process is then run starting from each set until the attacker agent 204 exceeds a target threshold used to define a sufficiently challenging attacker agent 204. Then, out of the 50 initial attack sets, only the samples in which the second operator agent maintained the power grid for fewer steps than the first operator agent are kept in the attack set. The final set is constructed by selecting the powerlines that were seen with the highest frequency within the identified sample sets. The attack space may be fixed as a certain percentage of the powerlines.

The ADCI system 200 employs an attacker agent reward function that measures the impact of an attack on the power grid. If the attacker agent 204 causes terminal state immediately after deploying an attack, the attacker agent 204 receives the maximum reward. Otherwise, the attack reward is based on the degree to which the powerlines are overloaded. As powerlines carry an increasing amount of power and approach their thermal limits, the probability that powerlines will overflow and be disconnected increases. The power that was flowing through the disconnected powerlines is diverted to other powerlines, potentially causes more disconnections, lack of stability, and eventually blackouts. This maximum reward teaches the attacker agent 204 to take advantage of this chain of events to destabilize the power grid and create challenging scenarios for the operator agent 203 to learn how to manage. The attacker agent reward function is:

$$r(s_t, a_t, s_{t+1}) = \begin{cases} r_{max} & \text{if } o_{t+1} \text{ is terminal} \\ \frac{1}{\|L\|} \sum_{l \in L} \frac{l^{pow}_{t+1}}{l_{limit}} & \text{otherwise,} \end{cases} \quad (1)$$

where L is the set of powerlines, $$l^{pow}_{t+1}$$

is the power flowing through line l at time t+1, $l_{limit}$ is the thermal limit of l, and $r_{max}$ is the maximum reward.

The ADCI system 200 can employ a Boltzmann policy along with a simulation function to determine the powerline that the attacker agent 204 targets. Given a set of candidate attacks drawn from the Boltzmann distribution applied to the attacker agent's action values, the attacker agent 204 simulates each one and selects the attack that maximizes the sum of the number of disconnected lines and the maximum percent capacity of the connected lines. The attacker agent 204 may also modify the observation data of the power grid before the operator agent 203 observation is collected. During the timesteps when the attacker agent 204 is targeting a powerline, the ADCI system 200 replays previous values for the grid measurements related to the specific powerline that is under attack. The replayed values come from the most recent observation prior to the attacker agent 204 commencing their attack. In this way, the operator agent 203 does not see direct evidence of the current attack, making the task of robust power grid operation and attack detection more challenging.

When a cyberattack occurs, either in a corporate network or an industrial control system, the security operations team is tasked with responding to the attack and restoring the systems to an attack-free state. Before recovery can begin, the cyberattack must be detected by a detector agent 205. To detect when an attacks occur, the detector agent 205 employs POMDP. The hidden state space of the POMDP of the detector agent 205 contains three states: pre-attack, postattack, and wait. In these states, the detector agent 205 can take one of two actions: detect an attack or continue normal operation.

Figure 3:
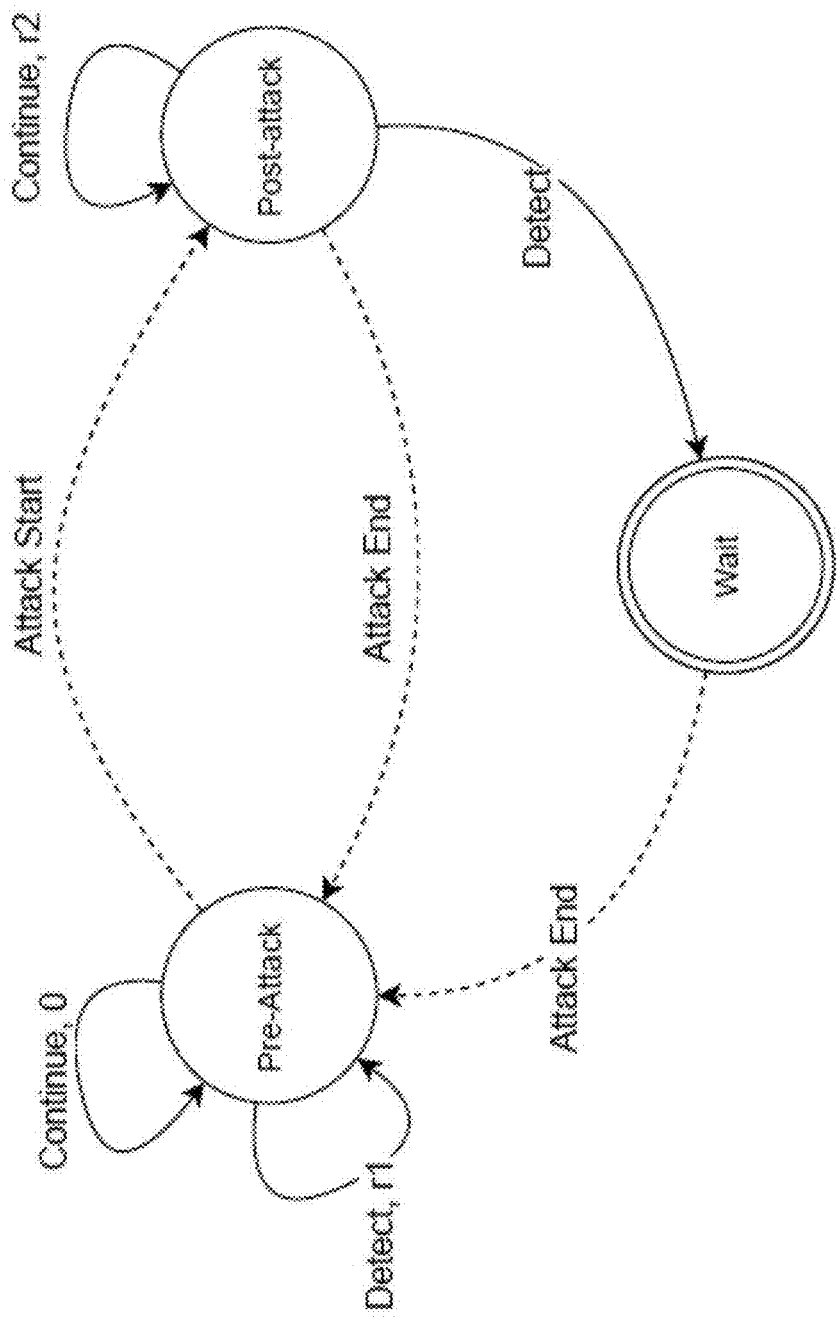
FIG. 3 is a state machine that illustrates the transition and reward functions for the detector agent.

FIG. 3 shows a state machine that illustrates the transition and reward functions for the detector agent 205. Both the detector agent 205 and the attacker agent 204 cause the hidden state to change. The solid arrows represent transitions caused by the detector agent 205 with their associated rewards, and the dashed arrows represent transitions caused by the attacker agent 204. If the detector agent 205 is able to detect that an attack is occurring, the hidden state transitions into the wait state. This state is terminal because the detector agent 205 achieved its detection goal for the attack. Once the detected attack ends, the hidden state transitions back to the pre-attack state. When in the waiting state, the power grid is assumed to be under attack and further investigation and mitigation steps may be needed.

To decide what detector action to take, the detector agent 205 inputs three observation components: the operator agent's prior observation, the action taken by the operator agent 203, and the operator agent's observation of the current power grid state. When an attacker agent 204 disconnects a powerline and corrupts the operator agent's observation, the observation is likely to appear different from what was expected because the values related to the disconnected line are replaced by previously recorded values. By examining the three observation components, this inconsistency can be observed. The ADCI system 200 computes the difference between the expected and actual observations and only reports measurements related to the powerline statuses and topography given in the previous observation and the next observation to help that detector agent 205 focus on the specific differences that a powerline disconnection attack is able to cause.

The ideal policy for a detector agent 205 would choose the detector action at the first timestep of the attack for a false negative rate of 0 and choose a continue action in any other situation for a false positive rate of 0. The detector agent reward function guides the detector agent 205 towards this ideal policy. When the detector agent 205 detects an attack when no attack is happening, this results in a false positive and the detector agent 205 receives a penalty. A false negative occurs when the detector agent 205 does not detect an ongoing attack. In this case, the detector agent 205 receives a penalty that linearly increases as the attack (that started at timestep t) remains undetected, scaled by a constant $c_3$. This encourages the detector agent 205 to detect attacks as soon as possible to minimize the attacker agent's dwell time and the damage caused by the attack. When the detector agent 205 acts correctly, resulting in a true positive or a true negative, the detector agent 205 receives a reward of 0. Given the current state and the detector agent action, $s_t$ and $a_t$, real and simulated observations, $o_{t+1}$ and $\hat{o}_{t+1}$, and the mean of the differences between features of the simulated and real observations, $\bar{o}$ computed prior to training the detection agent, the rewards are assigned as follows:

$$r(s_t, a_t, o_{t+1}, \hat{o}_{t+1}, \bar{o}, \tau) = \begin{cases} -c_2 \frac{\|o_{t+1} - \hat{o}_{t+1}\|}{\bar{o}} & s_t = Pre, \\ & a_t = detect(FP) \\ -c_3|t - \tau| & s_t = Post, \\ & a_t = continue(FN) \\ 0 & \text{otherwise.} \end{cases} \quad (2)$$

In contrast with the operator agent 203 and the attacker agent 204, the detector agent 205 uses an epsilon greedy policy. This policy trades off exploration and exploitation by choosing the action with the maximum action value a certain percent of the time and choosing a random action the rest of the time. Although the Boltzmann policy could be applied to the detector agent 205, it may be unnecessary because there are only two actions available to the detector agent 205. Therefore, the epsilon greedy policy may be a more effective method to occasionally choose the lower valued detector action compared to evaluating the softmax function at each step. At the beginning of the training phase, the exploration percentage is set high to allow the detector agent 205 to explore. As training progresses, this percentage decreases, allowing the detector agent 205 to exploit what it has learned.

The learning of the models 210 reflecting the policies by the Actor 201 is an iterative process involving simulating experiences and learning weights of the models based on the simulated experiences. The first step in the learning process is the simulation, which uses the current models to select an action, given an observation, as shown by example in Algorithm 1, below.

---
Algorithm 1: Agent acting process

Input: $\pi_o$, $\pi_a$, $\pi_d$: Shared operator, attacker, and detection policies
Input: $m_o$, $m_a$, $m_d$: Replay memories
1  while Learning is not complete do
2  | initialize the environment env;
3  | $o_t \leftarrow$ env.observe ( );
4  | while not done do
5  | | $a_o \leftarrow \pi_o (o_t)$;
6  | | $a_a \leftarrow \pi_o (o_t, a_o)$;
7  | | $o_{t+1}$, $r_o$, $r_a$, done $\leftarrow$ env.step ($a_o$, $a_a$);
8  | | $a_d \leftarrow \pi_d (o_t, a_o, o_{t+1})$;
9  | | $r_d \leftarrow$ env.detect ($a_d$):
10 | | if learning then
11 | | | $m_o$.add ($o_t$, $a_o$, $r_o$, $o_{t+1}$), done);
12 | | | $m_a$.add ($o_t$, $a_o$, $a_a$, $r_a$, $o_{t+1}$, done);
13 | | | $m_d$.add ($o_t$, $a_o$, $o_{t+1}$, $a_d$, $r_d$, $o_{t+1}$, done);
14 | | end
15 | | $o_t \leftarrow o_{t+1}$;
16 | end
17 end

---

The power grid environment is initialized at the beginning of each simulation (lines 1-3). The while loop that begins on line 4 iterates over each step of the simulation until the simulation ends. Each step begins with the operator agent 203 selecting an operator action (line 5). Next, the attacker agent 204 has the opportunity to select the attacker action it will deploy according to its own policy (line 6). The operator action and the attack action are passed to a step function, which returns the next observation of the power grid and a reward for the operator agent 203 and attacker agent 204 (line 7). Then, the detector agent 205 uses the previous and current observations and the operator action to decide whether it believes an attack is happening (line 8). The detector action (i.e., indicating an attack or no attack) is passed to the power grid environment's detect function, which returns a reward for the detector agent 205 (line 9). If the Actor is running in the context of training, as opposed to testing, the {observation, action, reward, next observation, done} tuples are added to the replay memory to be used by the Learner 202.

The training algorithm of the Learner 202 runs in parallel with the Actor 201 and is primarily responsible for updating the weights of the neural networks of the models (policies), as shown by example in Algorithm 2 below.

---
Algorithm 2: Training process
---
Input: $m_o$, $m_a$, $m_d$: Shared experience memories for
    the operator, attacker, and detector
Input: $\theta_o$, $\theta_a$, $\theta_d$: Parameters of the shared policy
    networks
Input: $\alpha$: Learning rate
Input: steps: Number of policy updates
1 for i ← 0 to steps do
2  | for m, θ in [($m_o$, $\theta_o$), ($m_a$, $\theta_a$), ($m_d$, $\theta_d$)] do
3  | | batch ← m.sample ( );
4  | | loss ← compute_loss (batch);
5  | | mpi_all_reduce (loss);
6  | | θ ← θ + $\alpha\nabla_\theta$loss ;
7  | end
8 end
---

To scale to large problem sizes, multiple, distributed ranks (spawn instances of an Actor 201 and a Learner 202) run the same training algorithm and communicate with each other when updating the neural networks. The main "for" loop beginning on line 1 performs a given number of updates to each neural network. The "for" loop beginning on line 2 performs an iteration for the operator model, the attacker model, and detector model. During each iteration, the training algorithm samples a batch of experiences (training data) from the replay memory and proceeds to update the corresponding neural network. A compute-loss function performs a forward pass of the neural network with the newly sampled batch as inputs and returns the corresponding loss value (line 4). Next, the training algorithm of each instance calculates a gradient of the loss for each trainable parameter of the neural network. Once, the gradients are computed locally by each instance, all Learners 202 participate in a synchronous all reduce operation to compute the mean of the gradients of all the instances (line 5). Once a Learner 202 calculates the mean gradients, the Learner 202 updates its local model (line 6) and continues to update the next model. The use of the mean gradient allows each Learner 202 to generate the weights a model thus synchronizing the models across Learners 202.

Figure 4:
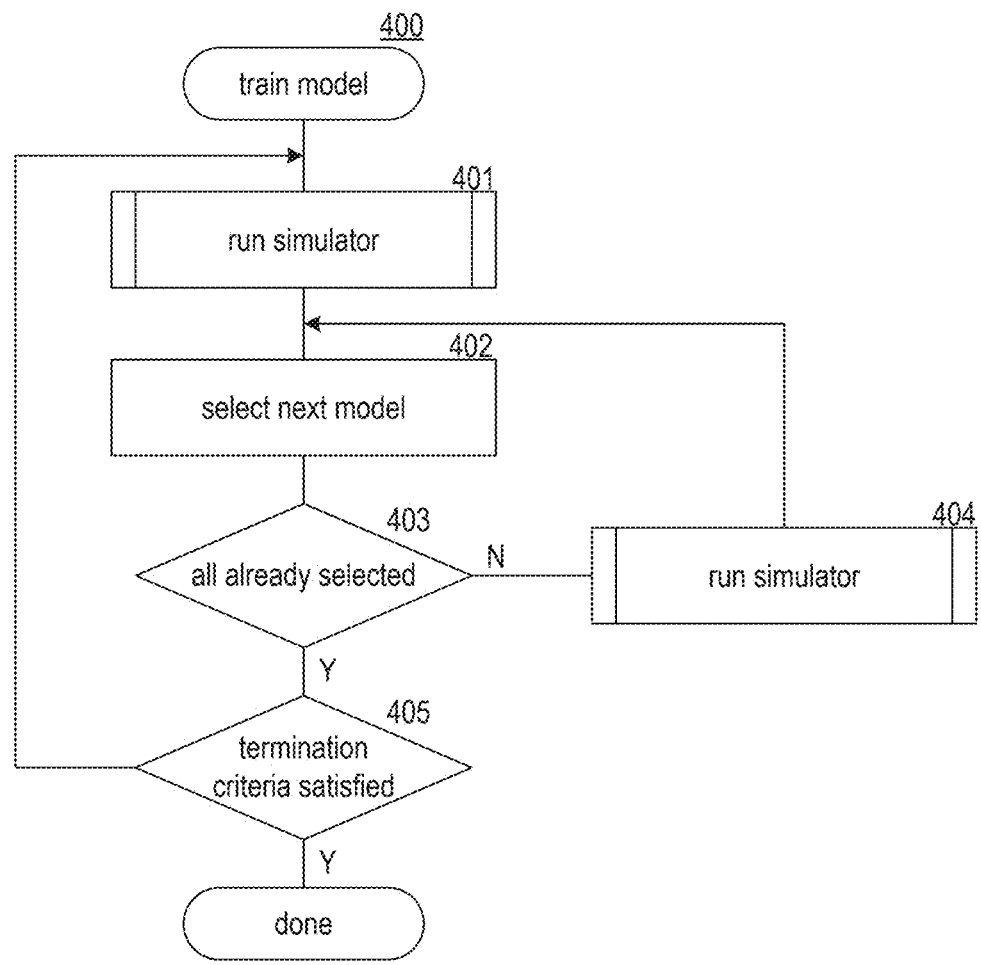
FIG. 4 is a flow diagram that illustrates the processing of a train models component of the ADCI system in some embodiments.

FIG. 4 is a flow diagram that illustrates the processing of a train models component of the ADCI system 200 in some embodiments. The train models component 400 is invoked to train the models using reinforcement learning. In block 401, the component invokes a run simulations component to run one or more simulations for an Actor to generate training data. In block 402, the component selects the next model. In decision block 403, if all the models have already been selected, then the component continues at block 405, else the component continues at block 404. In block 404, the component invokes a train model component to train the selected model and then loops to block 402 to select the next model. In decision block 405, if a termination condition is satisfied, then the component completes, else the component loops to block 401 to perform additional training of the models.

Figure 5:
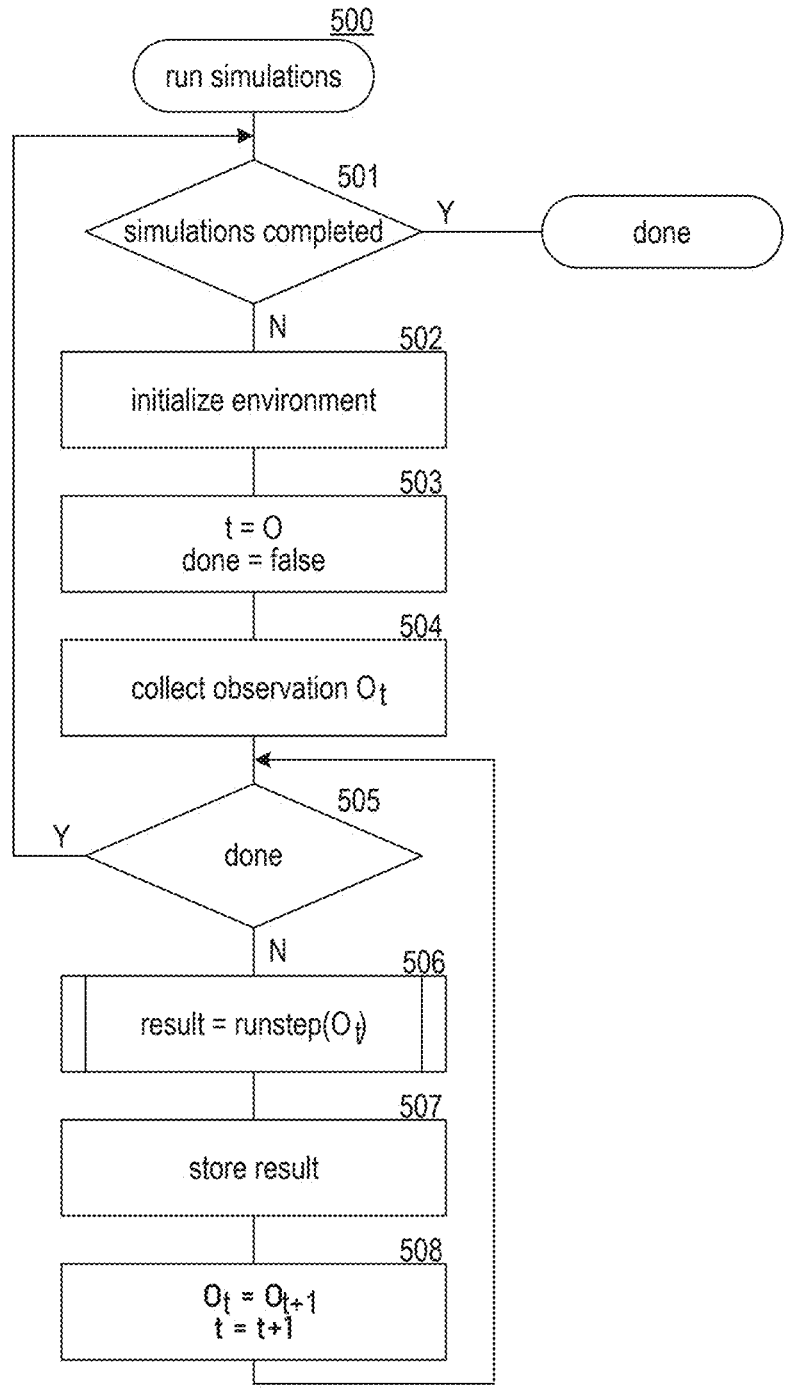
FIG. 5 is a flow diagram that illustrates the processing of a run simulations component of the ADCI system in some embodiments.

FIG. 5 is a flow diagram that illustrates the processing of a run simulations component of the ADCI system 200 in some embodiments. The run simulations component 500 is invoked to run simulations to generate training data. In decision block 501, if the simulations are complete, then the component completes, else the component continues at block 502. In block 502, the component initializes the power grid environment. In block 503, the component initializes the timestep and a done variable to indicate that the simulation is not done. In block 504, the component collects a current observation of the environment. In decision block 505, if the simulation is complete, then the component loops to block 501 to start the next simulation, else the component continues at block 506. In block 506, the component invokes a run timestep ("runstep") component to run timestep of the simulation based on the current observation. In block 507, the component stores the result of the timestep for use in training by the Learner. In block 508, the component sets the current state $O_t$ of the environment to the new environment generated by the simulation, increments the timestep t and loops to block 505 to continue the simulation.

Figure 6:
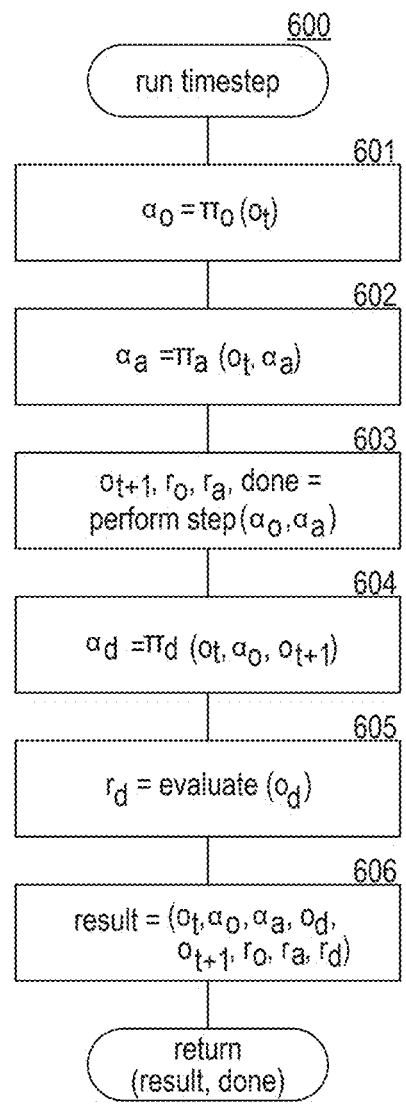
FIG. 6 is a flow diagram that illustrates the processing of a run timestep component of the ADCI system in some embodiments.

FIG. 6 is a flow diagram that illustrates the processing of a run timestep component of the ADCI system 200 in some embodiments. The run timestep component 600 is invoked to run a timestep for a simulation given the current observation of the power grid. In block 601, the component applies the operator model to generate an operator action given the current observation. In block 602, the component applies the attacker model to the current observation and the operator action to generate an attacker action. In block 603, the component performs a step of the simulation given the current observation, operator action, and attacker action to generate a new observation, and operator agent reward, an attacker agent reward, and a completion flag. In block 604, the component applies the detector model to the current state, the operator action, and the new state determined to generate a detector action. In block 605, the component evaluates the detector action to generate a reward for the detector. In block 605, the component sets the result to the current observation, the operator action, the attacker action, the detector action, the new observation, the operator reward, the attacker reward, and the detector reward. The component then returns the result along with the done flag.

Figure 7:
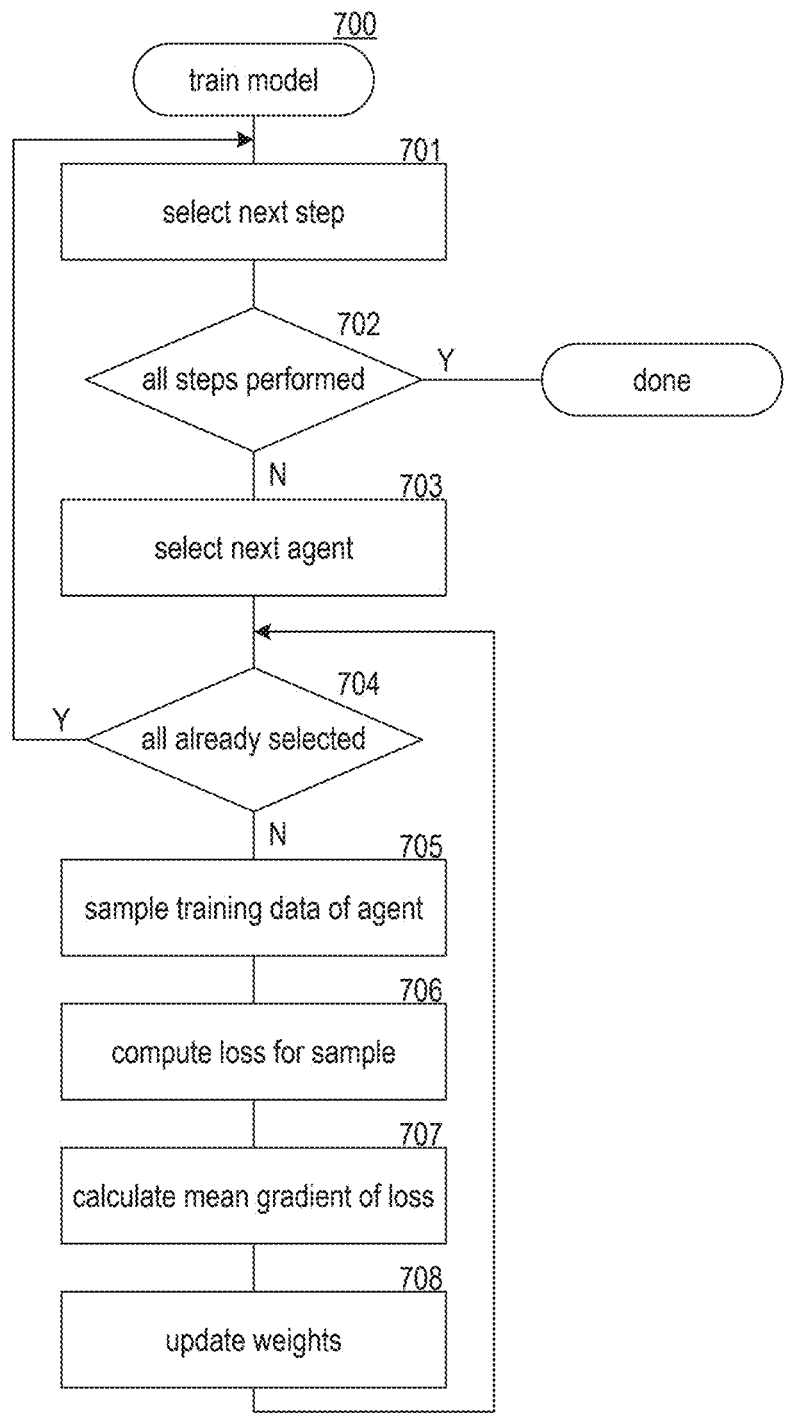
FIG. 7 is a flow diagram that illustrates processing of a train model component of the ADCI system in some embodiments.

FIG. 7 is a flow diagram that illustrates processing of a train model component of the ADCI system 200 in some embodiments. The train model component 700 trains a model. In block 701, the component selects the next step of the training. In decision block 702, if all the steps have already been performed, then the component completes, else the component continues at block 703. In step 703, the component selects the next agent. In decision block 704, if all the agents have already been selected, then the component loops to block 701 to perform the next step, else the component continues at block 705. In block 705, the component samples the training data for the agent. In block 706, the component computes a loss for the sample. In block 707, the component calculates a mean gradient of losses across the instances of the Learner. In block 708, the component updates the weights and then loops to block 703 to select the next agent. Although illustrated as updating the models in parallel, the models may alternatively be updated serially.

Figure 8:
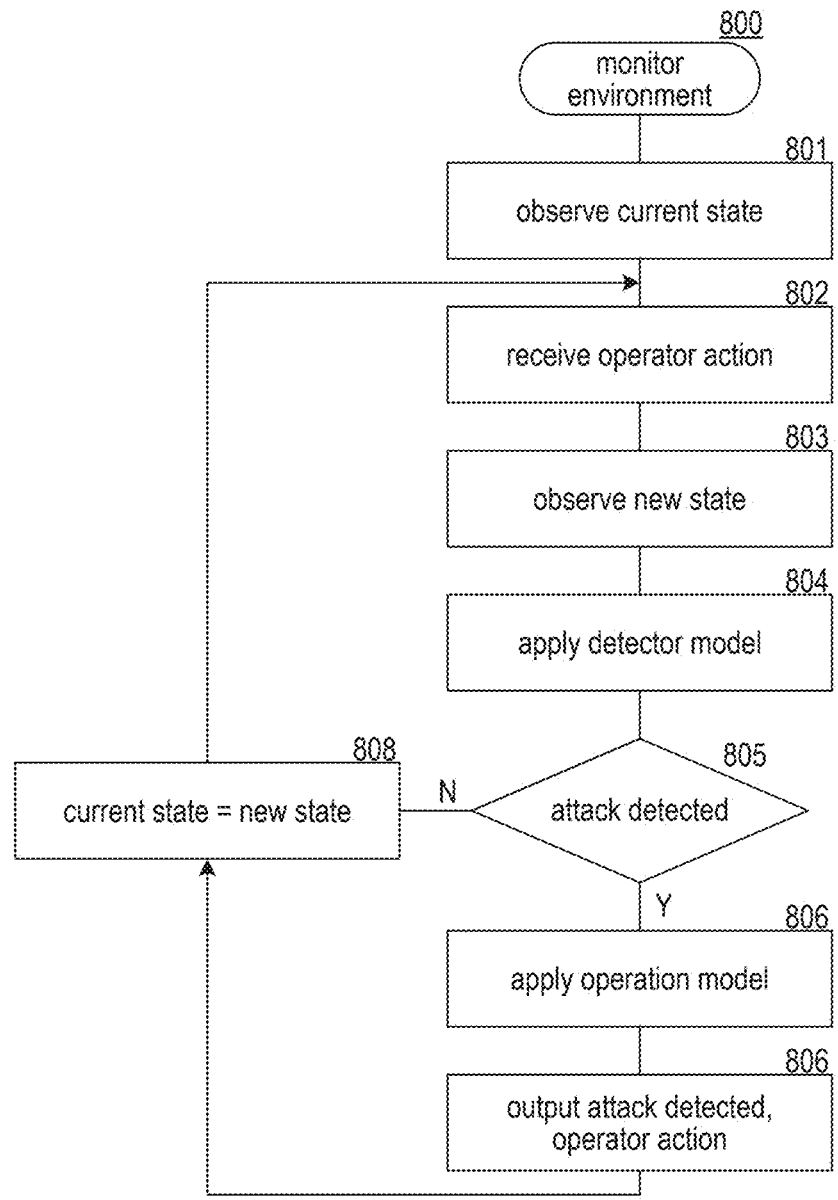
FIG. 8 is a flow diagram that illustrates the processing of a monitor environment component of the ADCI system in some embodiments.

FIG. 8 is a flow diagram that illustrates the processing of a monitor environment component of the ADCI system 200 in some embodiments. The monitor environment component 800 is employed during operation of the power grid to monitor the state of the power grid and generate operator actions that may be automatically applied to the power grid or provided to an operator to inform an operator when deciding what actions to perform on the power grid. In block

801, the component observes the current state of the power grid. In block 802, the component receives an operator action. In block 803, the component observes the new state of the power grid. In block 804, the component applies the detector model to determine whether an attack has occurred. In decision block 805, if an attack has occurred, then the component continues at block 806, else the component continues at block 808. In block 806, the component applies the operator model to generate an operator action as a countermeasure to the attack. In block 807, the component outputs an indication that an attack was detected and an indication of an operator action as a countermeasure. In block 808, the component sets the current state to the new state and loops to block 802 to continue the monitoring.

The ADCI system 200 may employ a variety of machine learning techniques. The models may employ any of a variety or combination of classifiers including neural networks such as fully-connected, convolutional, recurrent, autoencoder, or restricted Boltzmann machine, a support vector machine, a Bayesian classifier, and so on. When the model is a deep neural network, the training results in a set of weights for the activation functions of the deep neural network. A support vector machine operates by finding a hyper-surface in the space of possible inputs. The hyper-surface attempts to split the positive examples (e.g., feature vectors for photographs) from the negative examples (e.g., feature vectors for graphics) by maximizing the distance between the nearest of the positive and negative examples to the hyper-surface. This step allows for correct classification of data that is similar to but not identical to the training data. Various techniques can be used to train a support vector machine. In some embodiments, the detection model may be implemented using a support vector machine.

The ADCI system 200 may employ adaptive boosting in the training process. Adaptive boosting is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting may use weak classifiers that are single-split trees with only two leaf nodes.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, the classification system may use a radial basis function ("RBF") network and a standard gradient descent as the search technique.

The computing systems on which the ADCI system 200 may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the ADCI system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. The computing systems may be servers that are housed in a data center such as a cloud-based data center.

The ADCI system 200 may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the ADCI system 200 may be implemented in hardware using, for example, an application-specific integrated circuit (ASIC) or field programmable gate array ("FPGA").

Figure 9:
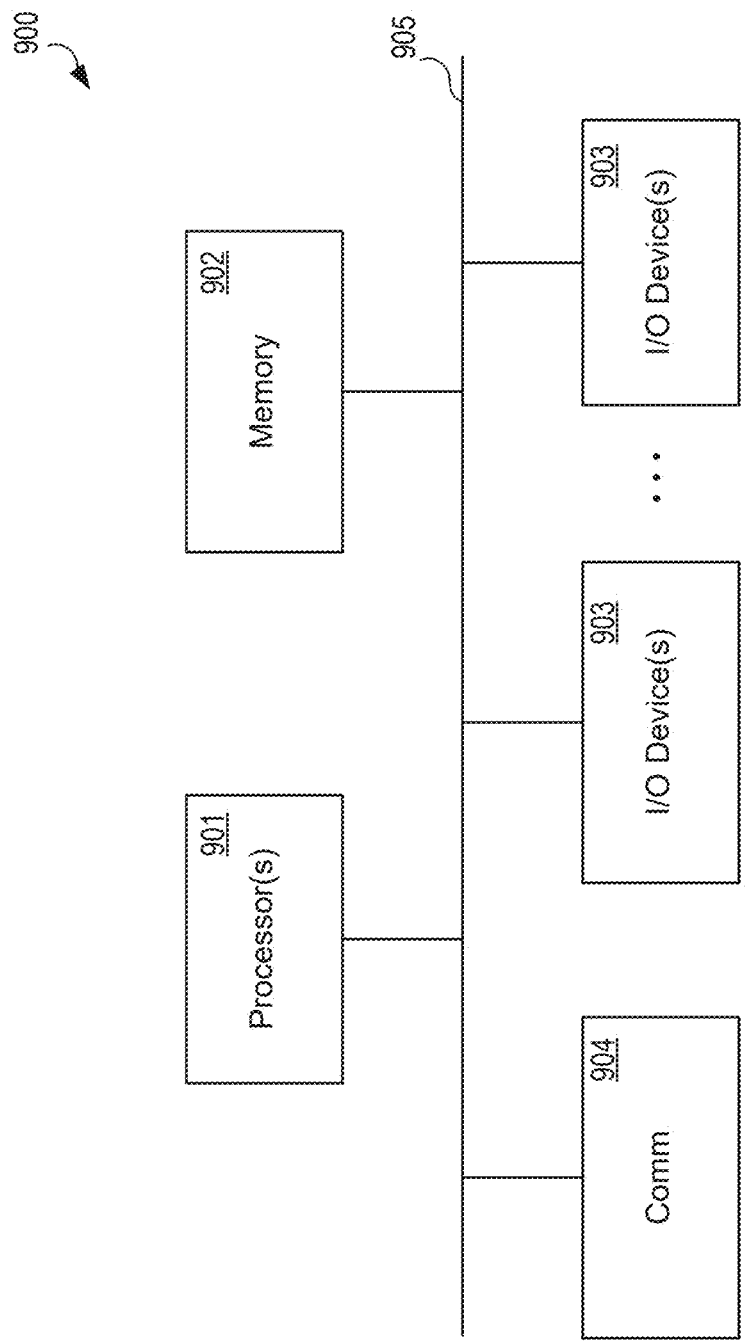
FIG. 9 is a high-level block diagram of a computer system in which a portion or all of the ADCI can be implemented.

FIG. 9 is a high-level block diagram of a computer system 900 in which a portion or all of the ADCI system 200 can be implemented. The computer system 900 includes one or more processors 901, one or more memories 902, one or more input/output (I/O) devices 903, and one or more communication interfaces 904, all connected to each other through an interconnect 905. The processor(s) 901 control the overall operation of the computer system 900, including controlling its constituent components. The processor(s) 901 may be or include one or more conventional microprocessors, programmable logic devices (PLDs), field programmable gate arrays (FPGAs), application-specific integrated circuits (ASICs), etc. The one or more memories 902 store data and executable instructions (e.g., software and/or firmware), which may include software and/or firmware for performing the techniques introduced above. The one or more memories 902 may be or include any of various forms of random access memory (RAM), read-only memory (ROM), volatile memory, nonvolatile memory, or any combination thereof. For example, the one or more memories 902 may be or include dynamic RAM (DRAM), static RAM (SDRAM), flash memory, one or more disk-based hard drives, etc. The I/O devices 903 provide access to the computer system 900 by human user, and may be or include, for example, a display monitor, audio speaker, keyboard, touch screen, mouse, microphone, trackball, etc. The communications interface 904 enables the computer system 900 to communicate with one or more external devices (e.g., one or more other computers) via a network connection and/or point-to-point connection. The communications interface 904 may be or include, for example, a Wi-Fi adapter, Bluetooth adapter, Ethernet adapter, Universal Serial Bus (USB) adapter, or the like, or a combination thereof. The interconnect 905 may be or include, for example, one or more buses, bridges or adapters, such as a system bus, peripheral component interconnect (PCI) bus, PCI extended (PCI-X) bus, USB, or the like.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method performed by one or more computing systems to support responding to a cyberattack on a physical infrastructure system via a computer network environment, the method comprising:
    accessing a specification of the physical infrastructure system that includes components having a plurality of states;
    running scenarios, comprising virtual simulations of the physical infrastructure system that output machine learning model training data, to modify a current state of the physical infrastructure system corresponding to the plurality of states, wherein running a scenario includes:
        modifying the current state of the physical infrastructure system based on an operator action, wherein a modification to the plurality of states includes a simulated change to a physical infrastructure topology;
        modifying the modified current state of the physical infrastructure system based on an attacker action to generate a new state; and
        detecting within the scenario whether an attack on the physical infrastructure system has occurred based on the operator action, the current state, and the new state;
    and
    training an operator model and a detector model based on the operator action, the attacker action, and a detection of whether an attack on the physical infrastructure system has occurred, wherein the operator model is trained to identify an effective operator action given a particular current state of the physical infrastructure system and the detector model is trained to detect an attack on the physical infrastructure system and said training modifies weights assigned to the operation action and the attacker action as associated with the particular current state and the detection of the attack respectively.

2. The method of claim 1, further comprising:
    training an attacker model in parallel with training the operator model and the detector model, based on the operator actions, the attacker actions, and the detections of the scenarios, wherein the attacker model is trained to identify effective attacks on the physical infrastructure system.

3. The method of claim 1, wherein the running a scenario generates an operator reward for each operator action as an indication of effectiveness of the operator action, an attacker reward for each attacker action as an indication of effectiveness of the attacker action, and a detector reward as an indication of effectiveness of the detection, and wherein the training the operator model and the detector model step factors in the operator reward, the attacker reward, and the detector reward.

4. The method of claim 1, further comprising:
    receiving a current state of a non-simulated, real environment of a physical infrastructure system, an operator action to modify the current state, and a new state after modification of the current state; and
    applying the detector model to the operator action, the current state, and the new state to detect whether an attack has occurred on the non-simulated, real environment of the physical infrastructure system.

5. The method of claim 4, further comprising:
    applying the operator model to identify an effective operator action when an attack is detected.

6. The method of claim 1, wherein the running scenarios and the training are performed iteratively, wherein the running employs the operator model, an attacker model, and the detector model that was last trained, respectively, to generate operator actions, to generate an attacker action, and to detect an attack.

7. The method of claim 1, wherein the physical infrastructure system is a power grid system includes generators, loads, substations, and lines.

8. The method of claim 1, wherein the computer network environment is an information technology (IT) environment.

9. A processing system configured to support responding to a cyberattack on a physical infrastructure system via a computer network environment, the system comprising:
   at least one processor; and
   at least one non-transitory computer-readable storage medium storing instructions, execution of which by the at least one processor causes the processing system to perform operations comprising:
      accessing a specification of the physical infrastructure system that includes components having a plurality of states;
      running scenarios, comprising virtual simulations of the physical infrastructure system that output machine learning model training data, to modify a current state of the physical infrastructure system corresponding to the plurality of states, wherein running a scenario includes:
         modifying the current state of the physical infrastructure system based on an operator action, wherein a modification to the plurality of states includes a simulated change to a physical infrastructure topology;
         modifying the modified current state of the physical infrastructure system based on an attacker action to generate a new state; and
         detecting within the scenario whether an attack on the physical infrastructure system has occurred based on the operator action, the current state, and the new state; and
      training an operator model and a detector model based on the operator action, the attacker action, and a detection of whether an attack on the physical infrastructure system has occurred, wherein the operator model is trained to identify an effective operator action given a particular current state of the physical infrastructure system and the detector model is trained to detect an attack on the physical infrastructure system and said training modifies weights assigned to the operation action and the attacker action as associated with the particular current state and the detection of the attack respectively.

10. The system of claim 9, the operations further comprising:
   training an attacker model in parallel with training the operator model and the detector model, based on the operator actions, the attacker actions, and the detections of the scenarios, wherein the attacker model is trained to identify effective attacks on the physical infrastructure system.

11. The system of claim 9, wherein the running a scenario generates an operator reward for each operator action as an indication of effectiveness of the operator action, an attacker reward for each attacker action as an indication of effectiveness of the attacker action, and a detector reward as an indication of effectiveness of the detection, and wherein the training the operator model and the detector model step factors in the operator reward, the attacker reward, and the detector reward.

12. The system of claim 9, the operations further comprising:
   receiving a current state of a non-simulated, real environment of a physical infrastructure system, an operator action to modify the current state, and a new state after modification of the current state; and
   applying the detector model to the operator action, the current state, and the new state to detect whether an attack has occurred on the non-simulated, real environment of the physical infrastructure system.

13. The system of claim 12, the operations further comprising:
   applying the operator model to identify an effective operator action when an attack is detected.

14. The system of claim 9, wherein the running scenarios and the training are performed iteratively, wherein the running employs the operator model, an attacker model, and the detector model that was last trained, respectively, to generate operator actions, to generate an attacker action, and to detect an attack.

15. The system of claim 9, wherein the physical infrastructure system is a power grid system and the components include generators, loads, substations, and lines.

16. The system of claim 9, wherein the computer network environment is an information technology (IT) environment.

* * * * *